United States Patent
Loehr et al.

(10) Patent No.: US 10,715,281 B2
(45) Date of Patent: Jul. 14, 2020

(54) ASYNCHRONOUS RETRANSMISSION PROTOCOL

(71) Applicant: Panasonic Intellectual Property Corporation of America, Torrance (CA)

(72) Inventors: Joachim Loehr, Hessen (DE); Alexander Golitschek Edler von Elbwart, Hessen (DE); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/090,464

(22) PCT Filed: Mar. 31, 2017

(86) PCT No.: PCT/EP2017/057649
§ 371 (c)(1),
(2) Date: Oct. 1, 2018

(87) PCT Pub. No.: WO2017/167944
PCT Pub. Date: Oct. 5, 2017

(65) Prior Publication Data
US 2019/0081743 A1 Mar. 14, 2019

(30) Foreign Application Priority Data

Apr. 1, 2016 (EP) ................................. 16000761
Apr. 6, 2016 (EP) ................................. 16164097

(51) Int. Cl.
*H04B 7/00* (2006.01)
*H04L 1/18* (2006.01)
(Continued)

(52) U.S. Cl.
CPC .......... *H04L 1/1851* (2013.01); *H04L 1/1812* (2013.01); *H04L 1/1874* (2013.01);
(Continued)

(58) Field of Classification Search
CPC ............... H04W 72/04; H04W 72/044; H04W 72/1278; H04W 72/14
(Continued)

(56) References Cited

U.S. PATENT DOCUMENTS 8,755,340 B2 6/2014 Anderson et al.
8,830,905 B2 * 9/2014 Ishii ...................... H04L 1/1887
370/232
(Continued)

FOREIGN PATENT DOCUMENTS

WO 2012/062668 A1 5/2012
WO 2014/073799 A1 5/2014

OTHER PUBLICATIONS

3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8)," Dec. 2012, 83 pages.
(Continued)

*Primary Examiner* — Dmitry Levitan
(74) *Attorney, Agent, or Firm* — Seed IP Law Group LLP

(57) ABSTRACT

The present disclosure relates to transmitting data over a physical uplink shared channel in a wireless communication system by using an asynchronous hybrid automatic repeat request, HARQ. An exemplary apparatus comprises a first timer configured to start upon uplink data transmission and stop after a first predetermined time; a second timer configured to start upon stop of the first timer and to stop after a second predetermined time; a receiver for receiving downlink control information including a positive acknowledge-
(Continued)

ment for uplink new data transmission or retransmission, the receiver being configured to perform the receiving only when the first timer is stopped and the second timer is running, wherein the second timer is further configured to stop upon receiving the positive acknowledgement. Moreover, an apparatus for receiving the data and transmitting the control channel is provided as well as the corresponding transmitting and receiving method.

11 Claims, 9 Drawing Sheets

(51) Int. Cl.
*H04W 52/02* (2009.01)
*H04W 72/12* (2009.01)
*H04W 4/70* (2018.01)
*H04W 76/28* (2018.01)
*H04W 76/27* (2018.01)
*H04L 5/00* (2006.01)
*H04W 72/04* (2009.01)
*H04W 80/02* (2009.01)

(52) U.S. Cl.
CPC .......... *H04L 1/1883* (2013.01); *H04L 1/1887* (2013.01); *H04L 5/0055* (2013.01); *H04W 4/70* (2018.02); *H04W 52/02* (2013.01); *H04W 52/0216* (2013.01); *H04W 72/042* (2013.01); *H04W 72/1289* (2013.01); *H04W 76/27* (2018.02); *H04W 76/28* (2018.02); *H04W 80/02* (2013.01); *Y02D 70/1242* (2018.01); *Y02D 70/1244* (2018.01); *Y02D 70/1246* (2018.01); *Y02D 70/1262* (2018.01); *Y02D 70/21* (2018.01); *Y02D 70/24* (2018.01)

(58) Field of Classification Search
USPC .......................................... 370/310, 328, 329
See application file for complete search history.

(56) References Cited

U.S. PATENT DOCUMENTS

| | | | |
|---|---|---|---|
| 9,402,229 B2* | 7/2016 | Wang | H04W 52/0225 |
| 9,414,313 B2* | 8/2016 | Virtej | H04W 52/0216 |
| 9,526,096 B2* | 12/2016 | Lee | H04L 1/1812 |
| 9,603,091 B2* | 3/2017 | Baldemair | H04L 1/0026 |
| 9,686,067 B2* | 6/2017 | Loehr | H04W 72/0413 |
| 10,200,185 B2* | 2/2019 | You | H04J 1/16 |
| 10,389,493 B2* | 8/2019 | Suzuki | H04W 28/04 |
| 2012/0113904 A1 | 5/2012 | Anderson et al. | |
| 2013/0223307 A1 | 8/2013 | Ohlsson et al. | |
| 2014/0254538 A1 | 9/2014 | Park et al. | |
| 2014/0295820 A1* | 10/2014 | Kim | H04W 52/0216 455/418 |
| 2015/0181571 A1* | 6/2015 | Park | H04W 52/0216 370/252 |
| 2015/0312889 A1* | 10/2015 | Lee | H04L 1/1812 370/280 |
| 2017/0078963 A1* | 3/2017 | Qi | H04W 52/0216 |

OTHER PUBLICATIONS

3GPP TS 36.211 V13.1.0, "3$^{rd}$ Generation Partnership Project; Technical Specification Group Radio Access Network; Evolved Universal Terrestrial Radio Access (E-UTRA); Physical Channels and Modulation (Release 13)," Mar. 2016, 155 pages.
3GPP TS 36.212 V 13.0.0, "3$^{rd}$ Generation Partnership Project; Technical Specification Group Radio Access Network; Evolved Universal Terrestrial Radio Access (E-UTRA); Multiplexing and channel coding (Release 13)," Dec. 2015, 121 pages.
3GPP TS 36.212 V13.1.0, "3$^{rd}$ Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.213 V11.1.0, "3$^{rd}$ Generation Partnership Project; Technical Specification Group Radio Access Network; Evolved Universal Terrestrial Radio Access (E-UTRA); Physical layer procedures (Release 11)," Dec. 2012, 160 pages.
3GPP TS 36.213 V13.1.0, "3$^{rd}$ Generation Partnership Project; Technical Specification Group Radio Access Network; Evolved Universal Terrestrial Radio Access (E-UTRA); Physical layer procedures (Release 13)," Mar. 2016, 361 pages.
3GPP TS 36.321 V13.1.0, "3$^{rd}$ Generation Partnership Project; Technical Specification Group Radio Access Network; Evolved Universal Terrestrial Radio Access (E-UTRA); Medium Access Control (MAC) protocol specification (Release 13)," Mar. 2013, 85 pages.
Ericsson [rapporteur], "Email discussion report on [92#44][LTE/MTC] MAC Open Items," Tdoc R2-161734, 3GPP TSG-RAN WG2 # 93, Agenda Item: 7.4.6, St. Julian's, Malta, Feb. 15-19, 2016, 29 pages.
Ericsson, "MAC impacts of asynchronous HARQ for BL UEs and UEs in EC," Tdoc R2-161689, 3GPP TSG-RAN WG2 #93, Agenda Item: 7.4.6, St. Julian's, Malta, Feb. 15-19, 2016, 10 pages.
Ericsson, "Revised WI: Further LTE Physical Layer Enhancements for MTC," RP-141865, 3GPP TSG RAN Meeting #66, Agenda Item: 12.2.2, Edinburgh, Scotland, Sep. 9-12, 2014, 9 pages.
Extended European Search Report, dated Jun. 30, 2017, for corresponding European Patent Application No. 16164097.4-1875, 14 pages.
International Search Report, dated Jun. 30, 2017, for corresponding International Patent Application No. PCT/EP2017/057649, 3 pages.
LG Electronics Inc., "DRX enhancement for NB-IOT," R2-161676, 3GPP TSG-RAN WG2 Meeting #93, Agenda Item: 7.16.3.1 (NB_IOT-Core), St. Julian's, Malta, Feb. 15-19, 2016, 2 pages.

* cited by examiner

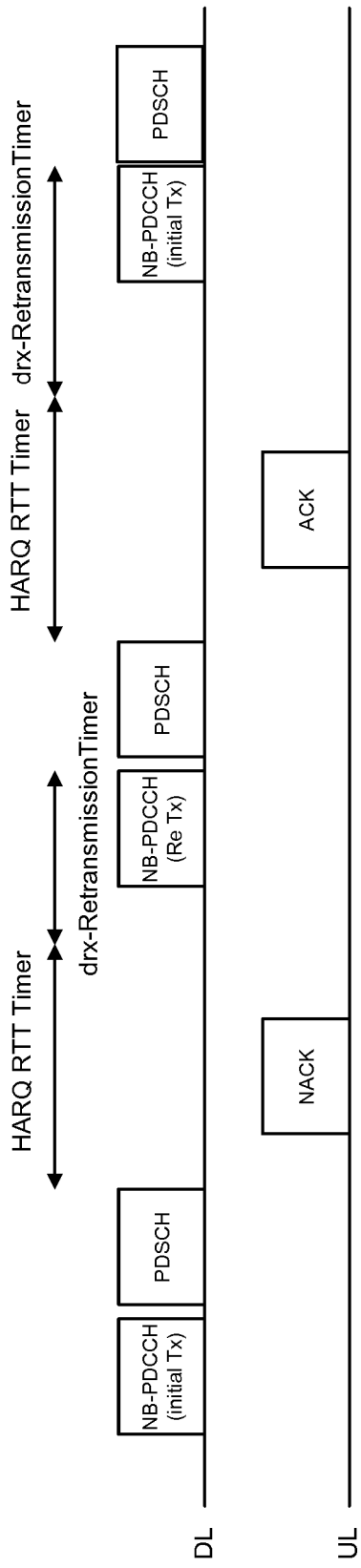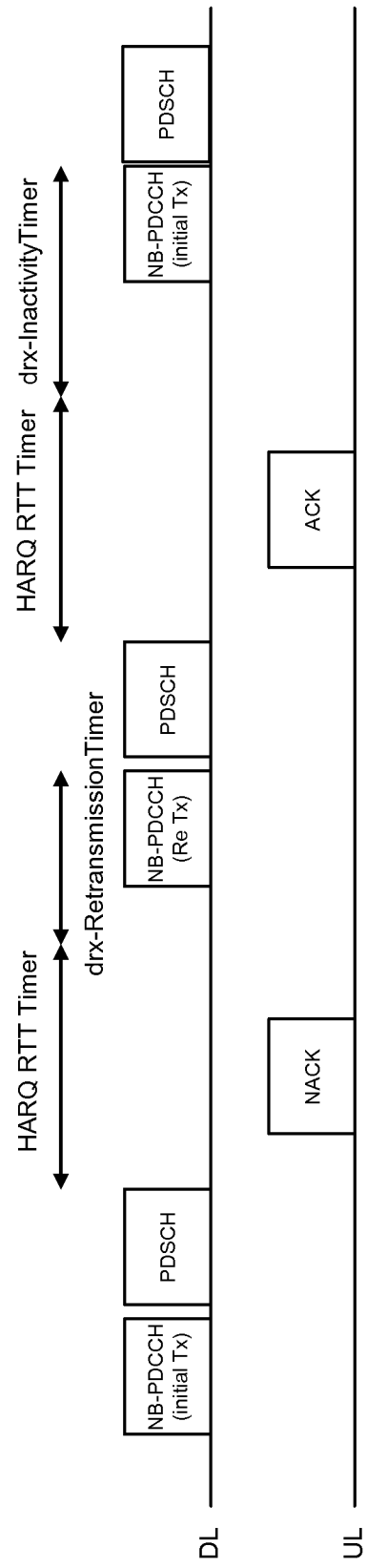

ASYNCHRONOUS RETRANSMISSION PROTOCOL

BACKGROUND

Technical Field

The present disclosure relates to an asynchronous hybrid automatic repeat request, HARQ, for transmission of data over an uplink physical shared channel.

Description of the Related Art

Long Term Evolution (LTE)

Third-generation (3G) mobile systems based on Wideband Code Division Multiple Access (WCDMA) radio-access technology have been deployed on a broad scale all around the world. A first step in enhancing or evolving this technology has been introducing High-Speed Downlink Packet Access (HSDPA) and an enhanced uplink, also referred to as High Speed Uplink Packet Access (HSUPA), providing a highly competitive radio-access technology. In order to be prepared for increasing user demands and to be competitive against new radio access technologies 3GPP further introduced a new mobile communication system which is called Long Term Evolution (LTE). The LTE is designed to meet the carrier needs for high speed data and media transport as well as high capacity voice support to the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) has been finalized in Release 8. The LTE system represents an efficient packet-based radio access and radio access networks that provide full IP-based functionalities. In the LTE, scalable multiple transmission bandwidths are specified such as 1.4, 3.0, 5.0, 10.0, 15.0, and 20.0 MHz, in order to achieve flexible system deployment using a given spectrum. In the downlink (direction from the network to the user), Orthogonal Frequency Division Multiplexing (OFDM) based radio access was adopted because of its inherent immunity to multipath interference (MPI) provided by a low symbol rate, the use of a cyclic prefix (CP), and its affinity to different transmission bandwidth arrangements. Single-carrier frequency division multiple access (SC-FDMA) based radio access was adopted in the uplink (direction from the user to the network), since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is adopted in Release-8 LTE.

LTE Architecture

The overall LTE architecture is shown in FIG. 1, whereas a more detailed representation of the E-UTRAN architecture is provided in FIG. 2. The E-UTRAN comprises of eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. The E-UTRA performs many functions including radio resource management, admission control, scheduling, enforcement of negotiated uplink (UL) Quality of Service (QoS), cell information broadcast, ciphering/deciphering of user and control plane data, and compression/decompression of downlink (DL) or UL user plane packet headers. The eNBs are interconnected with each other by means of the X2 interface. The eNBs are also connected by means of the S1 interface to the EPC (Evolved Packet Core), and more specifically to the MME (Mobility Management Entity) by means of the S1-MME and to the Serving Gateway (S-GW) by means of the S1-U. The S1 interface supports a many-to-many relation between MMEs/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g., parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

Component Carrier Structure in LTE

The downlink component carrier of a 3GPP LTE (Release 8 and further) is subdivided in the time-frequency domain in so-called subframes. In 3GPP LTE (Release 8 and further) each subframe is divided into two downlink slots, one of which is shown in FIG. 3. The first downlink slot comprises the control channel region (PDCCH region) within the first OFDM symbols. Each subframe consists of a given number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers. Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 3 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)," section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For the sake of terminology, in the following the time-frequency resources equivalent to the same $N_{sc}^{RB}$ consecutive subcarriers spanning a full subframe is called a "resource block pair," or equivalent "RB pair" or "PRB pair."

The term "component carrier" refers to a combination of several resource blocks in the frequency domain. In later releases of the LTE, the term "component carrier" is no longer used, instead, the terminology is changed to "cell," which refers to a combination of downlink and optionally uplink resources. The linking between the carrier frequency of the downlink resources and the carrier frequency of the uplink resources is indicated in the system information transmitted on the downlink resources. Similar assumptions for the component carrier structure apply to later releases too.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. User allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only to be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe. In 3GPP LTE, assignments for uplink data transmissions, also referred to as uplink scheduling grants or uplink resource assignments, are also transmitted on the PDCCH.

In the following the detailed L1/L2 control signaling information signaled for DL allocation respectively uplink assignments is described in the following:

Downlink Data Transmission:
Along with the downlink packet data transmission, L1/L2 control signaling is transmitted on a separate physical channel (PDCCH). This L1/L2 control signaling typically contains information on:
  The physical resource(s) on which the data is transmitted (e.g. subcarriers or subcarrier blocks in case of OFDM, codes in case of CDMA). This information allows the UE (receiver) to identify the resources on which the data is transmitted.
  the transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the UE (receiver) to identify the information bit size, the modulation scheme and the code rate in order to start the demodulation, the de rate matching and the decoding process. In some cases the modulation scheme maybe signaled explicitly.
  Hybrid ARQ (HARM) information:
    Process number: Allows the UE to identify the hybrid ARQ process on which the data is mapped
    Sequence number or new data indicator: Allows the UE to identify if the transmission is a new packet or a retransmitted packet
    Redundancy and/or constellation version: Tells the UE, which hybrid ARQ redundancy version is used (required for de-rate matching) and/or which modulation constellation version is used (required for demodulation)
  UE Identity (UE ID): Tells for which UE the L1/L2 control signaling is intended for. In typical implementations this information is used to mask the CRC of the L1/L2 control signaling in order to prevent other UEs to read this information.

Uplink Data Transmission:
To enable an uplink packet data transmission, L1/L2 control signaling is transmitted on the downlink (PDCCH) to tell the UE about the transmission details. This L1/L2 control signaling typically contains information on:
  The physical resource(s) on which the UE should transmit the data (e.g. subcarriers or subcarrier blocks in case of OFDM, codes in case of CDMA).
  The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate matching and the encoding process. In some cases the modulation scheme maybe signaled explicitly.
  Hybrid ARQ information:
    Process number: Tells the UE from which hybrid ARQ process it should pick the data
    Sequence number or new data indicator: Tells the UE to transmit a new packet or to retransmit a packet
    Redundancy and/or constellation version: Tells the UE, which hybrid ARQ redundancy version to use (required for rate matching) and/or which modulation constellation version to use (required for modulation)
  UE Identity (UE ID): Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:
  HARQ process number may not be needed in case of a synchronous HARQ protocol
  A redundancy and/or constellation version may not be needed if Chase Combining is used (always the same redundancy and/or constellation version) or if the sequence of redundancy and/or constellation versions is predefined.

Power control information may be additionally included in the control signaling

MIMO related control information, such as e.g. precoding, may be additionally included in the control signaling.

In case of multi-codeword MIMO transmission transport format and/or HARQ information for multiple code words may be included For uplink resource assignments (PUSCH) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RV0. The size of the CRC field of the PDCCH is 16 bits. Further detailed information on the control information for uplink resource allocation on PUSCH can be found in TS36.212 section 5.3.3 and TS36.213 section 8.6.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled. Further detailed information on the control information for uplink resource allocation on PUSCH can be found in TS36.212 section 5.3.3 and TS36.213 section 7.1.7.

Physical Downlink Control Channel (PDCCH) and Physical Downlink Shared Channel (PDSCH)

The physical downlink control channel (PDCCH) carries for example scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as a PDCCH region or control channel region. The remaining $N_{symb}^{PDSCH}=2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant (i.e., resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH. Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference. In particular, Table 8-2 of TS 36.213 defines the parameter k for the TDD configurations 0-6, where k indicates the positive offset of the target of an uplink resource allocation received in a subframe; for TDD configuration 0 there is an additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

Discontinuous Reception for Legacy LTE

In order to provide reasonable battery consumption of UE, LTE Rel-8/9 as well as Rel-10/11 provides a concept of discontinuous reception (DRX). DRX functionality can be configured for an RRC_CONNECTED state UE so that it does not always need to monitor the downlink channels.

A DRX cycle consists of an "on duration" period, during which the UE monitors the PDCCH and a "DRX period" during which a UE can skip reception of downlink channels for battery saving purposes.

The "on duration" period is duration (counted in downlink subframes) after waking up from DRX, during which the UE receives (i.e., monitors) the PDCCHs for scheduling messages. If the UE successfully decodes a PDCCH, the UE stays awake and starts an "inactivity timer," defining a time period (counted in downlink subframes) during which the UE monitors PDCCH. When the UE fails to detect and decode the PDCCH during this period, it re-enters the DRX. The UE restarts the inactivity timer following a single successful decoding of a PDCCH for a first transmission only (i.e., this does not apply to retransmissions).

The total duration that the UE is awake is called "active time" and includes the "on-duration" of the DRX cycle, the time UE is performing continuous reception while the inactivity timer has not expired, as well as the time UE is performing continuous reception while waiting for a DL retransmission after one HARQ RTT. Similarly for the uplink, the UE is awake at the subframes where uplink retransmission grants can be received, i.e., every 8 ms after initial uplink transmission until a maximum number of retransmissions is reached. Based on the above, the minimum active time is of length equal to the on-duration, and the maximum is undefined (infinite). Furthermore, after having sent an SR (scheduling request) on the PUCCH, the UE will be awake monitoring for a PDCCH allocating UL-SCH resources. The DRX period is the duration of downlink subframes during which the UE can skip reception of downlink channels for battery saving purposes.

FIG. 6 illustrates an DRX cycle. The parameterization of the DRX cycle (i.e., lengths of the on duration and the DRX period) involves a trade-off between battery saving and latency. On the one hand, a long DRX period is beneficial for lengthening the UE's battery life. For example, in the case of a web browsing service, it is usually a waste of resources for a UE to continuously to receive downlink channels while the user is reading a downloaded web page. On the other hand, a shorter DRX period is better for faster response when data transfer is resumed—for example when a user requests another web page.

To meet these conflicting requirements, two DRX cycles—a short cycle and a long cycle—can be configured for each UE. The transitions between the short DRX cycle, the long DRX cycle and continuous reception are controlled either by a timer or by explicit commands from the eNB. In some sense, the short DRX cycle can be considered as a confirmation period in case a late packet arrives, before the UE enters the long DRX cycle—if data arrives at the eNB while the UE is in the short DRX cycle, the data is scheduled for transmission at the next wake-up time and the UE then resumes continuous reception. On the other hand, if no data arrives at the eNB during the short DRX cycle, the UE enters the long DRX cycle, assuming that the packet activity is finished for the time being.

Available DRX values are controlled by the network and start from non-DRX up to x seconds. Value x may be as long as the paging DRX used in the RRC IDLE state (i.e., in the state in which the UE has RRC connection established and merely checks for paging signals). Measurement requirements and reporting criteria can differ according to the length of the DRX interval, i.e., long DRX intervals may experience more relaxed requirements. When DRX is configured, periodic CQI/SRS reports shall only be sent by the UE during the active time. RRC can further restrict periodic CQI reports so that they are only sent during the on duration.

In FIG. 7, a example of the DRX cycle is shown based on the subframe granularity. The UE checks for scheduling messages (indicated by its C-RNTI on the PDCCH as described above) during the on duration period of either the long DRX cycle or the short DRX cycle depending on the currently active cycle. When a scheduling message is received during the on duration, the UE starts the inactivity timer and monitors the PDCCH in every subframe while the inactivity timer is running. During this period, the UE can be regarded as being in a continuous reception mode. Whenever a scheduling message is received while the inactivity timer is running, the UE restarts the Inactivity timer, and when it expires the UE moves into a short DRX cycle and starts a "Short DRX cycle timer." The short DRX cycle may also be initiated by means of a MAC Control Element. When the short DRX cycle timer expires, the UE moves into the long DRX cycle. In addition to this DRX behavior, a "HARQ Round Trip Time (RTT) timer" is defined with the aim of allowing the UE to sleep during the HARQ RTT. When decoding of a downlink transport block for one HARQ process fails, the UE can assume that the next retransmission of the transport block will occur after at least "HARQ RTT" subframes. While the HARQ RTT timer is running, the UE does not need to monitor the PDCCH. At the expiry of the HARQ RTT timer, the UE resumes reception of the PDCCH as normal.

The above mentioned DRX related timers like DRX-Inactivity timer, HARQ RTT timer, DRX retransmission timer and Short DRX cycle timer are started and stopped by events such as reception of a PDCCH grant or MAC Control element (DRX MAC CE); hence the DRX status (active time or non-active time) of the UE can change from one subframe to another and is hence not always predictable. There is only one DRX cycle defied per UE (which may include long and short components). All aggregated component carriers follow this DRX pattern.

HARQ Protocol

The MAC layer comprises a HARQ entity, which is responsible for transmit and receive HARQ operations. The transmit HARQ operations includes transmission and retransmission of transport blocks, as well as reception and processing of ACK/NACK signaling. The receive HARQ operations include reception of transport blocks, combining of the received data and generation of ACK/NACK signaling. In order to enable continuous transmission while previous transport blocks are being decoded, up to eight HARQ processes in parallel are used to support multi-process "Stop-And-Wait" (SAW) HARQ operation which has been adopted for the PDSCH/PUSCH. Each HARQ process is responsible for a separate SAW operation and manages a separate buffer.

The feedback provided by the HARQ protocol is either a (positive) Acknowledgment (ACK) or a negative Acknowledgment (NACK). Furthermore, in HARQ operation the eNB can transmit different coded versions from the original transport block in retransmissions so that the UE can employ incremental-redundancy-(IR)-combining to get additional coding gain via the combining gain.

If a packet coded with forward error coding (FEC) such as turbo or convolutional coding is transmitted and the receiver fails to decode the packet correctly (errors are usually checked by a CRC, Cyclic Redundancy Check), the receiver requests a retransmission of the packet. Generally (and throughout this document), the transmission of additional information is called "retransmission (of a packet)," and this retransmission could but does not necessarily mean a transmission of the same encoded information; it could also mean the transmission of any information belonging to the packet (e.g., additional redundancy information) e.g., by use of different redundancy versions.

In general, HARQ schemes can be categorized as either synchronous or asynchronous, with the retransmissions in each case being either adaptive or non-adaptive. Synchronous HARQ means that the retransmissions of transport blocks for each HARQ process occur at pre-defined (periodic) times relative to the initial (previous) transmission. Hence, no explicit signaling is required to indicate to the receiver the retransmission schedule, or e.g., the HARQ process number since it can be inferred from the transmission timing.

In contrast, asynchronous HARQ allows the retransmissions to occur at any time relative to the initial (previous) transmission, which offers the flexibility of scheduling retransmissions based on air-interface conditions and other factors like cell load or QoS. In this case however, additional explicit signaling is required to indicate, e.g., the resources for retransmissions and—if applicable—the HARQ process to the receiver, in order to allow for a correct combining and HARQ protocol operation.

In LTE, asynchronous adaptive HARQ is used for the downlink, and synchronous HARQ for the uplink. In the uplink, the retransmissions may be either adaptive or non-adaptive, depending on whether new signaling of the transmission attributes is provided, e.g., in an uplink grant. In uplink HARQ protocol operation (i.e., for acknowledging uplink data transmissions) there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions, the scheduled time instances correspond to the synchronous timing of the HARQ).

In case of a synchronous non-adaptive retransmission, the retransmission will use the same parameters as the previous uplink transmission, i.e., the retransmission will be signaled on the same physical channel resources, respectively uses the same modulation scheme/transport format. The redundancy version though will change, i.e., cycle through the predefined sequence of redundancy versions which is 0, 2, 3, 1.

Since synchronous adaptive retransmissions are explicitly scheduled via the PDCCH, the eNodeB has the possibility to change certain parameters for the retransmission (compared to the first transmission or generally previous transmission). A retransmission could be for example scheduled on a different frequency resource in order to avoid fragmentation in the uplink, or eNodeB could change the modulation scheme or indicate to the user equipment what redundancy version to use for the retransmission. It should be noted that the HARQ feedback (ACK/NACK) and PDCCH signaling occurs at the same timing for UL HARQ FDD operation. Therefore, the user equipment only needs to check once whether a synchronous non-adaptive retransmission is triggered (i.e., only a NACK is received) or whether eNodeB requests a synchronous adaptive retransmission (i.e., PDCCH is also signaled) or requests a new initial transmission.

With such a simultaneous transmission, the user terminal is able to determine what the PDCCH instructs the terminal to do, i.e., to perform a new transmission (new UL grant with toggled NDI) or a retransmission (referred to as adaptive retransmission) (new UL grant without toggled NDI value), regardless of the PHICH content. When no PDCCH for the terminal is detected, the PHICH content dictates the UL HARQ behavior of the terminal, which is summarized in the following. The term "NDI" is an abbreviation for "New Data Indicator," which when toggled means that the corresponding transmission is a first transmission (initial transmission) of the data.

Upon receiving NACK, the terminal performs a non-adaptive retransmission, i.e., a retransmission on the same uplink resource as previously used by the same HARQ process. Upon receiving ACK, the terminal does not perform any uplink retransmission and keeps the data in the HARQ buffer for that HARQ process. A further transmission for that HARQ process needs to be explicitly scheduled by a subsequent grant by PDCCH. Until the reception of such grant, the terminal is in a "suspension state."

The UL HARQ protocol behavior is illustrated in the following Table:

| HARQ feedback seen by the UE (PHICH) | PDCCH seen by the UE | UE Behavior |
| --- | --- | --- |
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

The schedule timing of the uplink HARQ protocol in LTE is exemplarily illustrated in FIG. 8. The eNB transmits to the UE a first uplink grant 301 on PDCCH, in response to which, the UE transmits first data 302 to the eNB on PUSCH. The timing between the PDCCH uplink grant and the PUSCH transmission is currently fixed to 4 ms. After receiving the first data transmission 302 from the UE, the eNB transmits feedback information (ACK/NACK) and possibly an UL grant 303 for the received transmission to the UE (alternatively, when the UL transmission was successful, the eNB could have triggered a new uplink transmission by transmitting a suitable second uplink grant). The timing between the PUSCH transmission and the corresponding PHICH carrying the feedback information is currently also fixed to 4 ms. Consequently, the Round Trip Time (RTT) indicating the next (re)transmission opportunity in the uplink HARQ protocol is 8 ms. After these 8 ms, the UE may transmit a retransmission 304 of previous data as instructed by the eNB. For the further operation, it is assumed that the retransmission 304 of a previously transmitted data packet was again not successfully decoded such that the eNodeB would instruct the UE to perform another retransmission (e.g., transmitting a NACK 305 as a feedback). In response thereto, the UE would thus perform a further retransmission 306.

At the top of FIG. 8, the subframe numbering is listed as well as an exemplary association of the HARQ processes with the subframes. As apparent therefrom, each of the 8 available HARQ processes is cyclically associated with a respective subframe. In the exemplary scenario of FIG. 8, it is assumed that the initial transmission 302 and the corresponding retransmissions thereof 304 and 306 are handled by the same HARQ process number 5.

Measurement gaps for performing measurements at the UE are of higher priority than HARQ retransmissions. Thus, whenever an HARQ retransmission collides with a measurement gap, the HARQ retransmission does not take place. On the other hand, whenever a HARQ feedback transmission over the PHICH collides with a measurement gap, the UE assumes an ACK as the content of the expected HARQ feedback. A relevant part of the HARQ operation is defined, e.g., in 3GPP TS 36.321, "Medium Access Control (MAC) protocol specification," version 13.1.0, clause 5.4.2 "HARQ operation."

NB-IoT/eMTC

Cellular-based Internet of Things (IoT) technologies have become an important branch of Internet of Everything (IoE). To meet the new connectivity requirements of the emerging massive IoT segment, 3GPP has taken evolutionary steps on both the network side and the device side.

The key improvement areas addressed in 3GPP up to Release 13 are:

Lower device cost—cutting module cost for LTE devices by reducing peak rate, memory requirement and device complexity. The LTE module cost-reduction evolution started with the introduction of LTE for machine-type communication (LTE-M) Cat 1 devices with reduced peak rate to a maximum of 10 Mbps, and continued in Releases 12 and 13 with reduced device complexity for lower performance and using less bandwidth or a narrowband IoT carrier to cut costs further.

Improved battery life—more than 10 years of battery life can be achieved by introducing Power Saving Mode and/or extended discontinuous reception (eDRX) functionality. These features allow the device to contact the network—or to be contacted—on a per-need basis, meaning that it can stay in sleep mode for minutes, hours or even days.

Improved coverage—an improvement of 15 dB on LTE-M and of 20 dB on NB-IoT and GSM, which translates into a seven-fold increase in the outdoor coverage area and significantly improved indoor signal penetration to reach deep indoors. This supports many IoT devices like smart meters, which are often placed in a basement. An improved coverage is achieved by time-domain repetitions.

Support for massive numbers of IoT connections—specifically, one LTE cell site can support millions of IoT devices, depending on the use case. Core network enhancements include software upgrades for service differentiation handling, signaling optimization and high-capacity platforms (more than 30 million devices per node).

In addition to LTE-M (enhanced Machine-Type Communication, MTC), which will deliver a suite of features, as part of Release 13 of the 3GPP standard, to lower power consumption, reduce device complexity/cost, and provide deeper coverage to reach challenging locations (e.g., deep inside buildings), the NB-IoT technology is being standardized for 3GPP Release 13.

NB-IoT (Narrow-Band Internet of Things) provides access to network services using physical layer optimized for very low power consumption (e.g., full carrier bandwidth is 180 kHz, subcarrier spacing can be 3.75 kHz or 15 kHz)—addressing the low throughput IoT applications sometimes referred to as Low Power Wide Area (LPWA). Such applications include smart water/gas metering, municipal light and waste management, livestock breeding and irrigation, and environment monitoring. NB-IoT will provide improved indoor coverage, support of massive number of low-throughput Things, low-delay sensitivity, ultra-low device cost, lower device power consumption, and optimized network architecture. The technology can be deployed in-band, utilizing resource blocks within normal LTE carrier, or in the unused resource blocks within a LTE carrier's guard-band, or standalone for deployments in dedicated spectrum. The technology is also particularly suitable for the refarming of GSM channels.

The NB-IoT technology and the LTE-M rounds out the 3GPP cellular IoT portfolio with various ongoing initiatives that scale cellular technologies to connect a much wider variation of consumer and enterprise use cases. This portfolio of cellular technologies that provide globally standardized, reliable (based on licensed spectrum) solutions meet a rich and varied set of IoT services. Furthermore, these solutions are being designed so that operators can maximally reuse their deployed network infrastructure and will not have to deploy a brand new network to address the IoT market.

Coverage Enhancements for NB-IoT/eMTC

In LTE Rel-13, coverage enhancements will be specified to target Maximum Coupling Loss (MCL) of 155.7 dB. This will provide increased cell coverage area as well as the ability to support MTC devices (eMTC/NB-IoT) in locations with high penetration losses (e.g., smart meters installed in the basement). However, Rel-13 low-complexity devices will have smaller coverage due to reduced capacities, namely 1 Rx (receiving) antenna will lead to approximately 4 dB degradation in performance of the downlink channels. This is due to a lack of receiver combining and diversity gain. Reduced maximum transmit power will lead to a corresponding degradation in coverage of the uplink channels. Reduced UE bandwidth of 1.4 MHz in downlink and uplink can lead to degradation in performance due to a lack of diversity gain. It has been estimated that this results in approximately 1-3 dB loss in performance. In order to reach the targeted 155,7 dB MCL, different channels (UL/DL) require different coverage enhancement amounts, e.g., 18 dB coverage enhancement is need for PUSCH of a Rel-13 low-cost device. In order to achieve the coverage enhancements several coverage enhancement techniques are used.

Some techniques such as relaxing the performance requirements, multiple decoding attempts, and multi-subframe channel estimations do not require specification changes other than to redefine the appropriate performance requirements. Other techniques such as repetition/subframe bundling, overhead reduction, and increasing reference signal density will require standard changes. Note that coverage enhancement will be scalable and configurable, with the aim to minimize the amount of reception and transmission time for each device. A mechanism to identify coverage range will be needed so that the device can be configured for appropriate coverage enhancement amount. For more details, see for example 3GPP RP-141865, "Revised WI: Further LTE Physical Layer Enhancements for MTC" sourced by Ericsson, available at http://www.3gpp.org and incorporated herein by reference.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE. As described above, there will be different levels of CE depending on the network support and UE capability, e.g., 5/10/15 dB coverage extension.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement. An exemplary implementation of these repeated transmissions prescribes that the same data is transmitted across multiple sub-frames. Yet, it will become immediately apparent that these repeated transmissions will use more resources (time-frequency) than what is required for normal coverage UEs. The transport block size used for transmission to the MTC devices will likely be less than 1000 bits.

Uplink HARQ Protocol for NB-IoT/eMTC

For NB-IoT as well as eMTC (Rel-13), an asynchronous UL HARQ protocol has been introduced. Different to the synchronous Uplink HARQ protocol used for legacy LTE, retransmissions for NB-IoT or eMTC UEs are adaptive and asynchronous. In particular, the retransmissions do not need to occur at a fixed timing relative to the previous HARQ transmission for the same process, which offers the flexibility of scheduling retransmissions explicitly. Furthermore there will be no explicit HARQ feedback channel (PHICH), i.e., retransmissions/initial transmissions are indicated by PDCCH (NDI distinguishing between initial transmission and retransmission). Essentially, the uplink HARQ protocol behavior for NB-IoT or eMTC UEs will be very similar to the asynchronous HARQ protocol used for the downlink since Release 8.

It should be noted that for the NB IoT, there will be only one UL HARQ process. For more information on the asynchronous uplink HARQ protocol introduced for NB-IoT/eMTC UEs please refer to section 5.4.2 of 3GPP TS 36.321 V13.1.0 (2016 March) incorporated herein by reference.

Uplink HARQ Protocol for Unlicensed Carrier Transmissions

Up to Release 13, uplink transmissions were only supported for licensed carriers. For features other than NB-IoT and eMTC (Rel-13), the corresponding UL HARQ protocol is synchronous. However due to the opportunistic access characteristic of unlicensed carriers, it seems inappropriate to have the fixed retransmissions timings and associations between a transmission time interval and a HARQ process established by a synchronous protocol. Therefore an asynchronous HARQ protocol is also a strong candidate for uplink transmissions on an unlicensed carrier.

It should be noted that in contrast to NB IoT, there will be more than one UL HARQ process.

BRIEF SUMMARY

As can be seen from the above mentioned background, LTE provides several new features for an efficient IoT implementation. The new features are typically added on the top of the features of earlier releases. However, introducing new features based on the legacy system may cause some redundancies and interpretation problems for interaction between the legacy system and the new features.

For instance, due to the introduction of the asynchronous HARQ protocol for the uplink, it may be beneficial to adapt its interaction with the DRX operation. In particular, similarly to the downlink operation also for the uplink, two new DRX-related timers have been introduced for the eMTC respectively NB IoT, namely a drx-ULRetransmissionTimer and an UL HARQ RTT Timer. The drx-ULRetransmissionTimer specifies the maximum number of consecutive PDCCH-subframe(s) until a UL retransmission grant is received. The UL HARQ RTT Timer specifies the minimum amount of subframe(s) before an UL HARQ retransmission grant is expected by the MAC entity. It may be advantageous to efficiently handle operation of the new timers and enable efficient DRX operation.

This is achieved by the features of the independent claims.

Further advantageous embodiments are subject matter to the depended claims.

According to an embodiment, an apparatus is provided for transmitting data over a physical uplink shared channel in a wireless communication system by using an asynchronous hybrid automatic repeat request, HARQ, the apparatus comprising: a first timer configured to start upon uplink data transmission and stop (expire) after expiry of a first predetermined time; a second timer configured to start upon expiry of the first timer and to stop (expire) after expiry of a second predetermined time; a receiver for receiving downlink control information including a positive acknowledgement for uplink new data transmission or retransmission, the receiver being configured to perform the receiving only when the first timer has expired and the second timer is running, wherein the second timer is further configured to stop upon receiving the positive acknowledgement.

According to another embodiment, a method is provided for transmitting data over a physical uplink shared channel in a wireless communication system by using an asynchronous hybrid automatic repeat request, HARQ, comprising: starting a first timer upon uplink data transmission and stopping the first timer after expiry of a first predetermined time; starting a second timer upon expiry of the first timer and stopping the second timer after expiry of a second predetermined time; receiving downlink control information including a positive acknowledgement for uplink new data transmission or retransmission, wherein the receiving is only performed when the first timer is expired and the second timer is running, wherein the second timer stops upon receiving the positive acknowledgement.

BRIEF DESCRIPTION OF THE SEVERAL VIEWS OF THE DRAWINGS

The above and other objects and features of the present invention will become more apparent from the following description and preferred embodiments given in conjunction with the accompanying drawings in which:

FIG. 10B is a schematic drawing illustrating timers for NB IoT for downlink, FIG. 10C is a schematic drawing illustrating timers for NB IoT for downlink.

DETAILED DESCRIPTION

The present disclosure relates to HARQ for uplink and in particular to the efficient operation for asynchronous retransmissions in connection with active/inactive timers.

The following description focusses on the application of HARQ to the NB IoT feature, however this should not be understood in restricting the applicability to other features adopting asynchronous HARQ.

Figure 1:
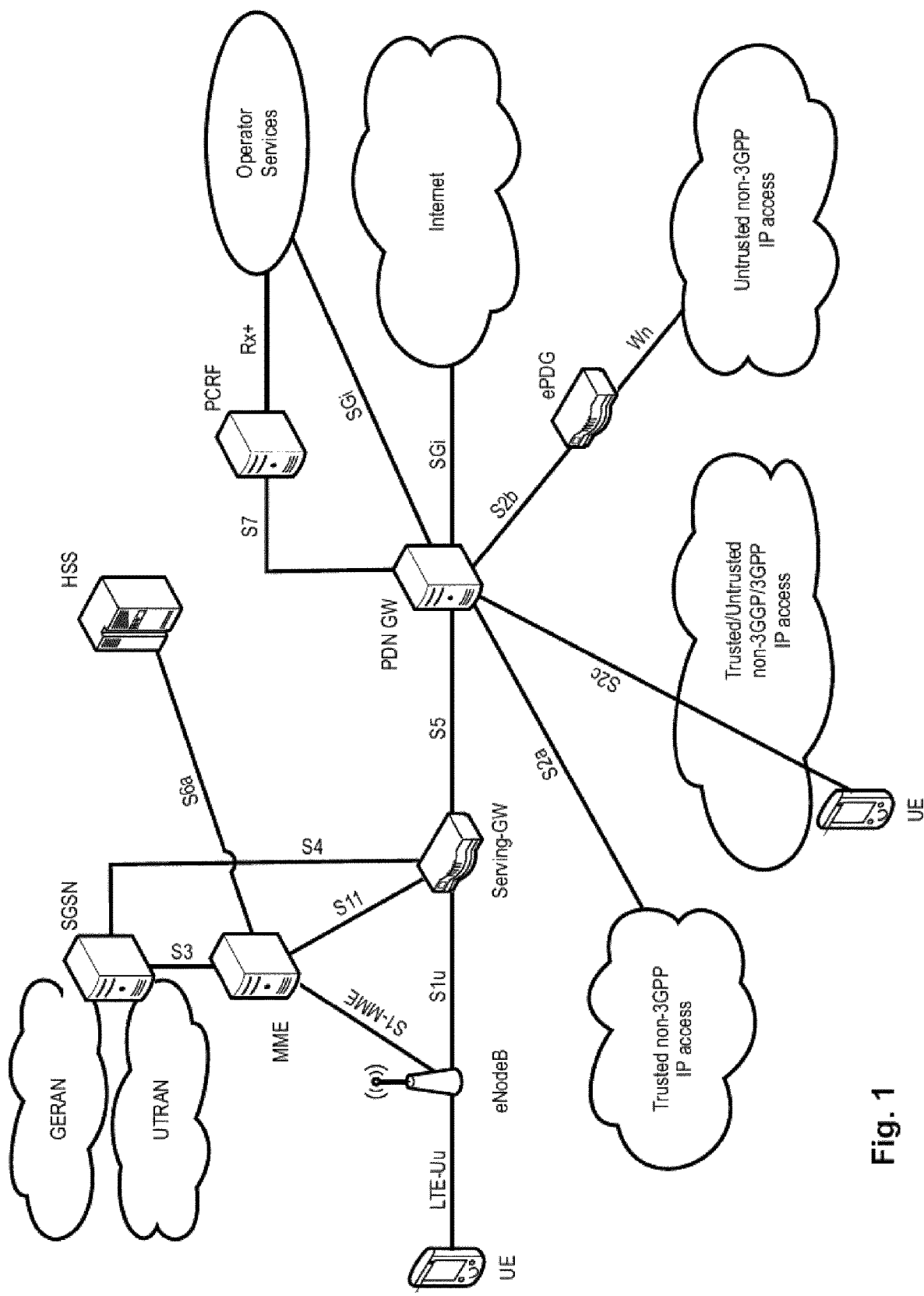
FIG. 1 is a block diagram showing an exemplary architecture of a 3GPP LTE system.
Figure 3:
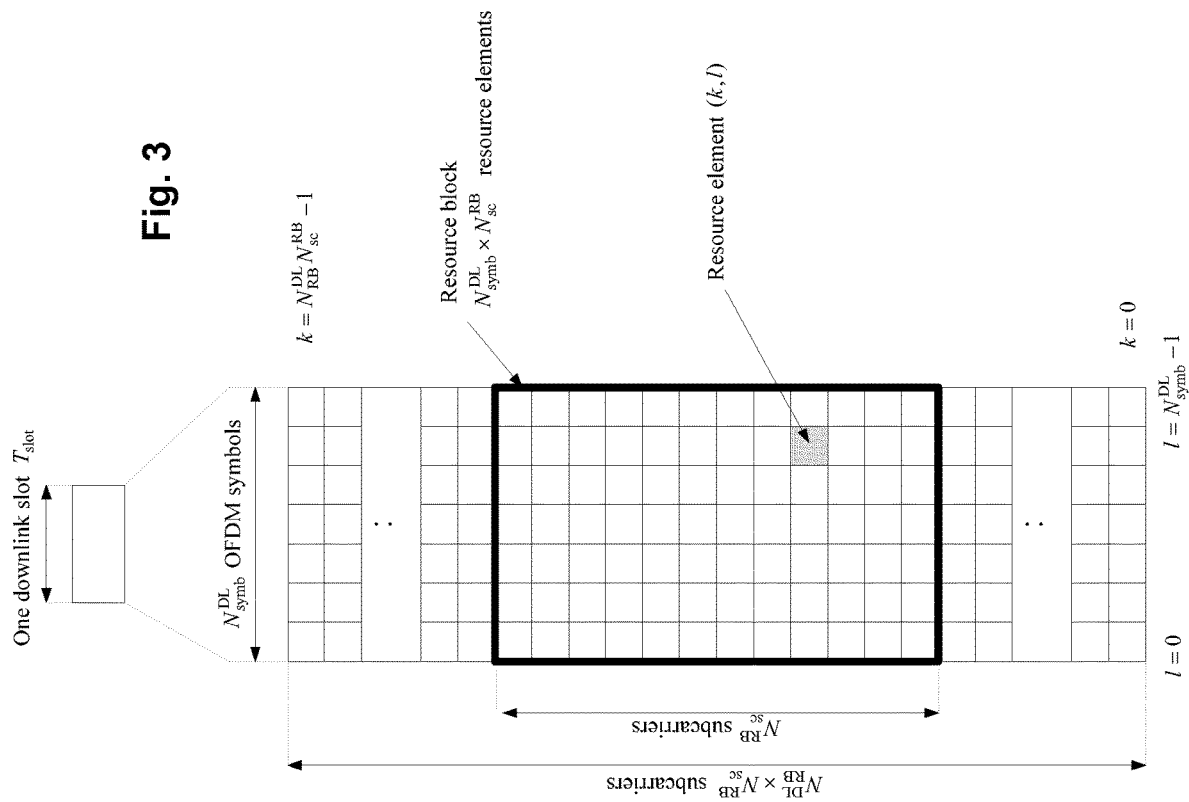
FIG. 3 is a schematic drawing showing an exemplary downlink resource grid of a downlink slot as defined for 3GPP LTE (as of Release 8/9)
Figure 2:
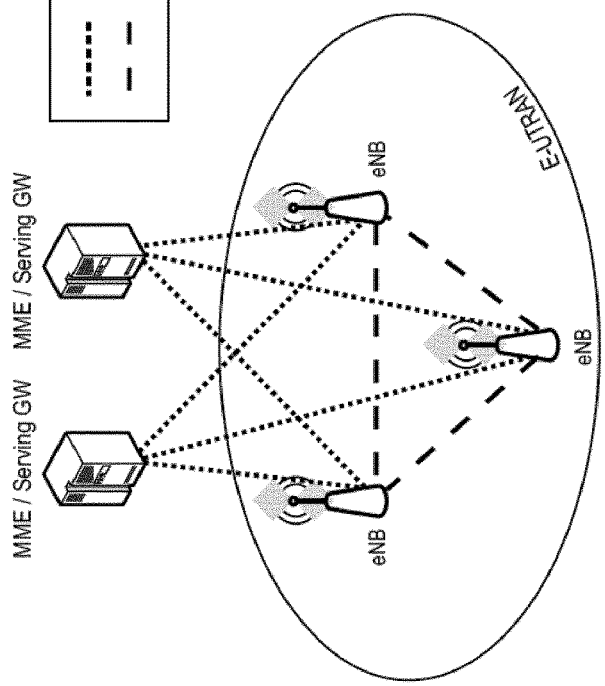
FIG. 2 is a block diagram showing an exemplary overview of the overall E-UTRAN architecture of 3GPP LTE.
Figure 4:
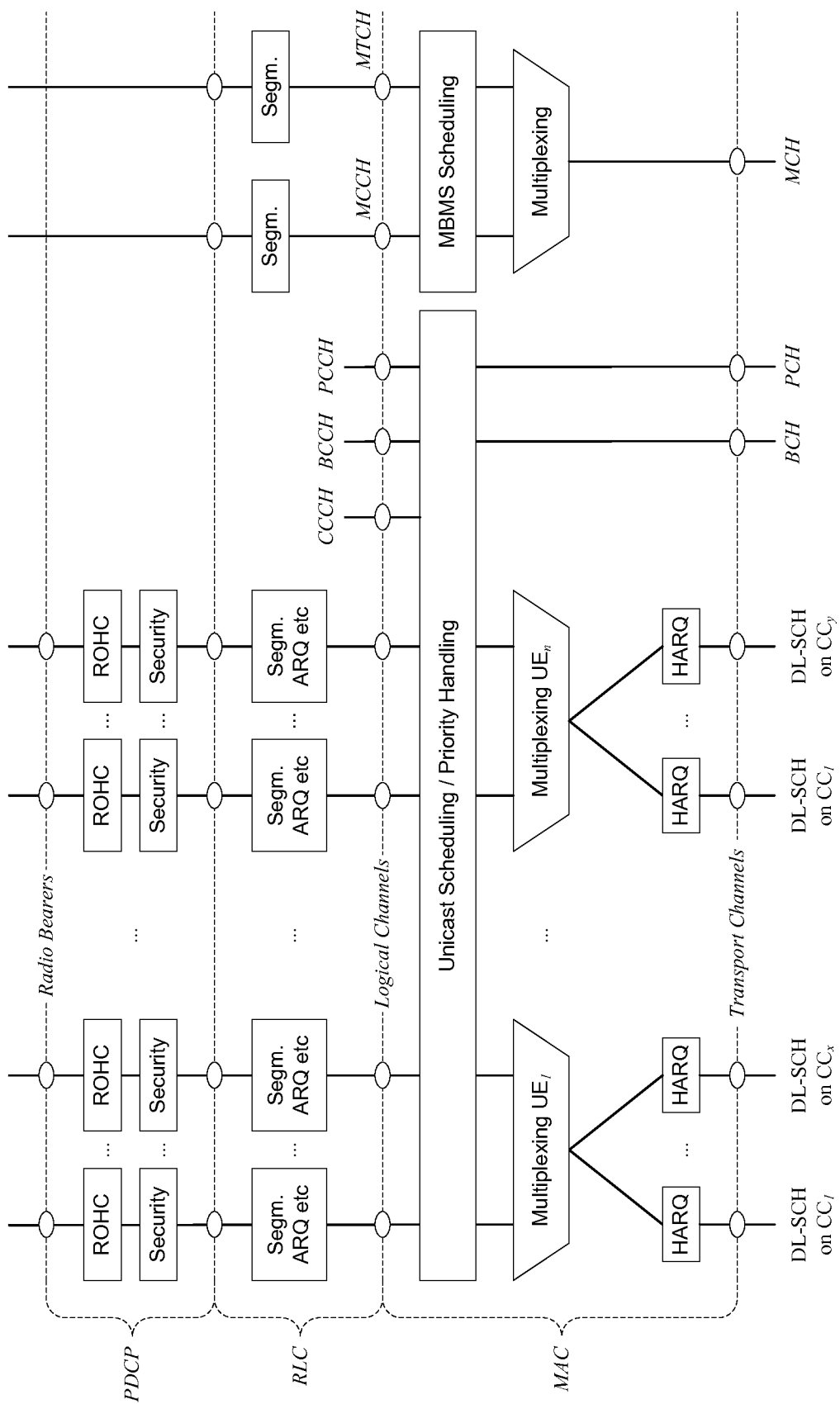
FIG. 4 is a schematic drawing illustrating layer 2 downlink structure with configured carrier aggregation.
Figure 5:
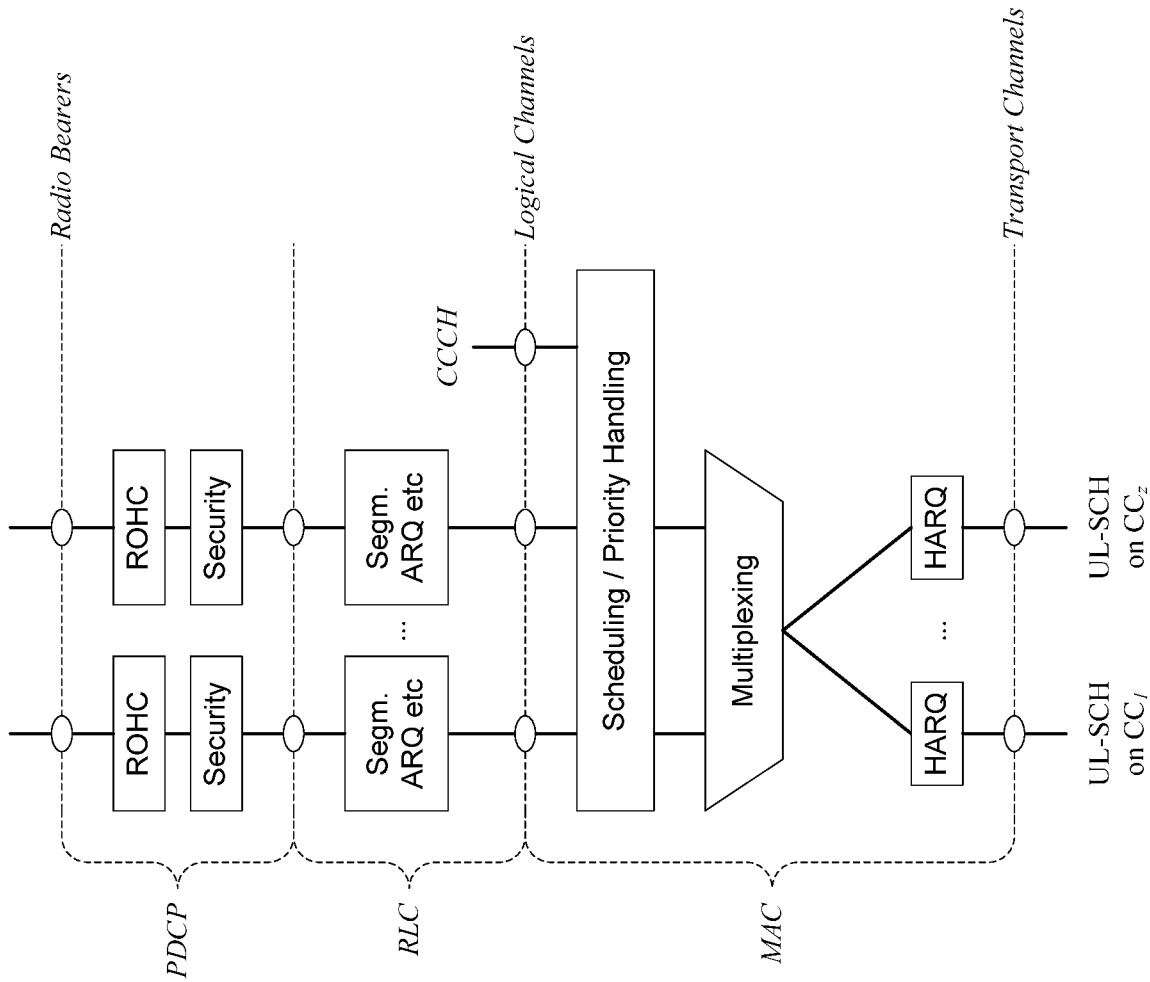
FIG. 5 is a schematic drawing illustrating layer 2 downlink structure with configured carrier aggregation.
Figure 6:
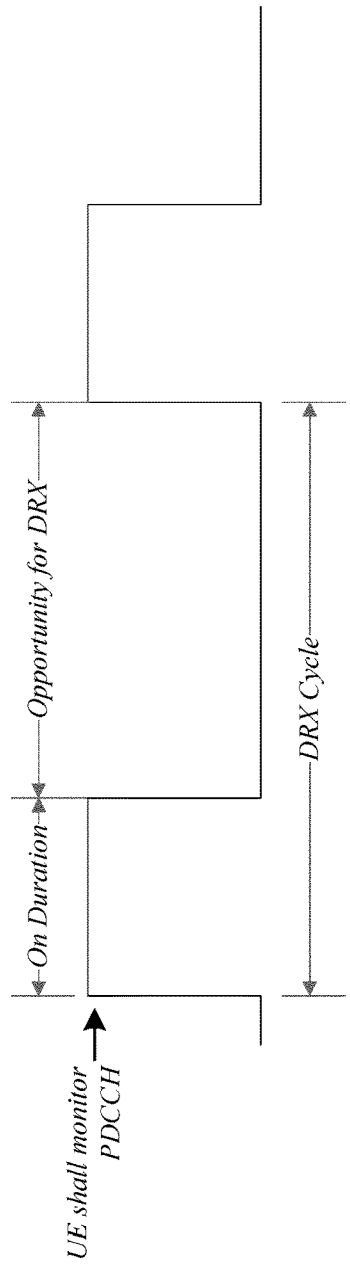
FIG. 6 is a schematic drawing illustrating a DRX cycle.
Figure 7:
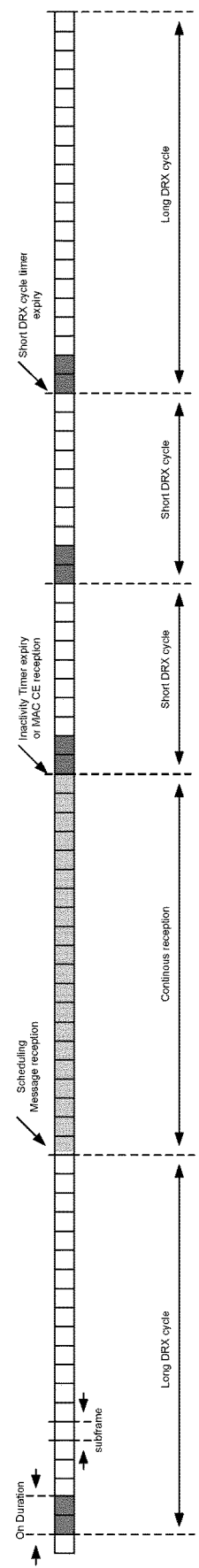
FIG. 7 is a schematic drawing illustrating short and long DRX cycles.
Figure 8:
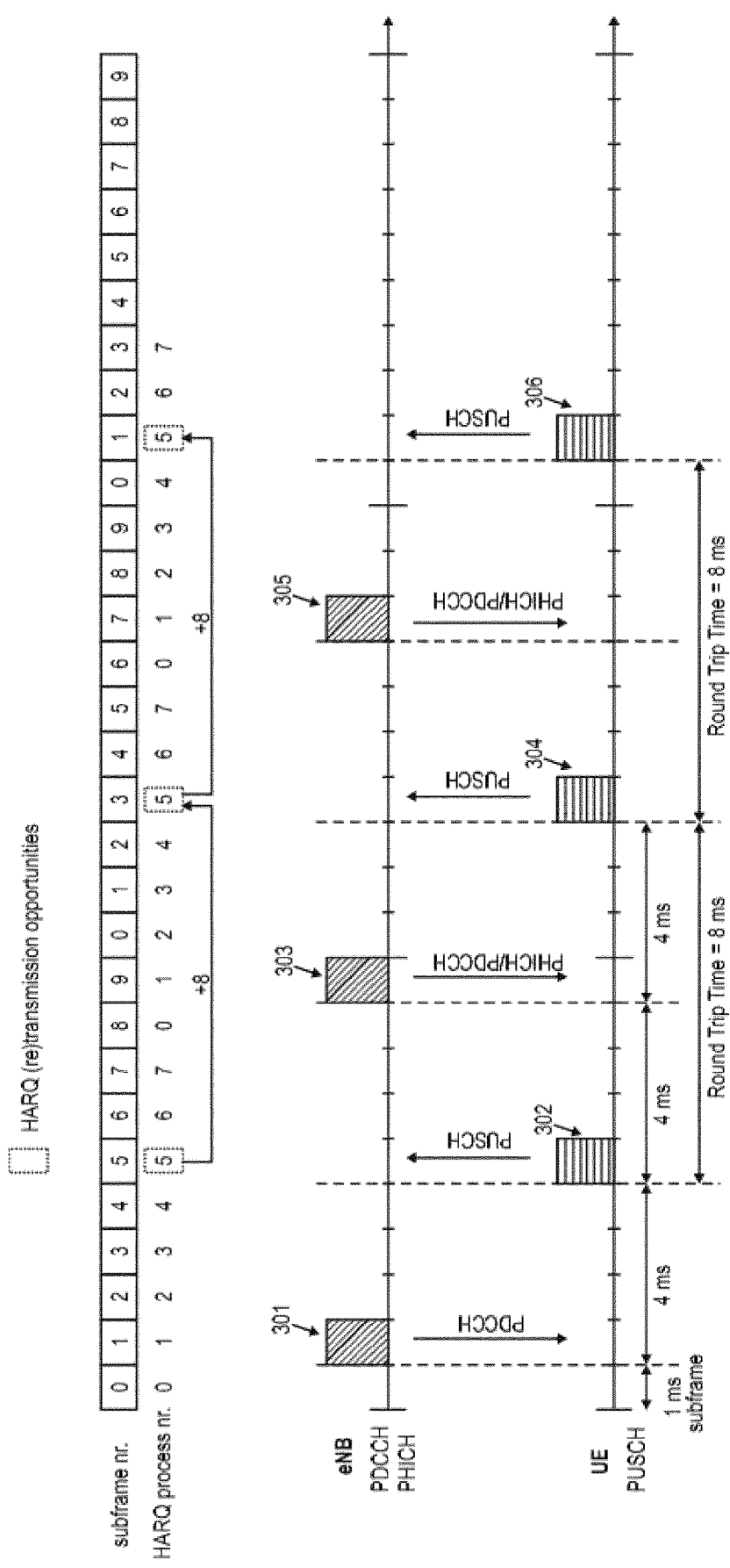
FIG. 8 is a schematic drawing illustrating HARQ using PHICH.
Figure 9:
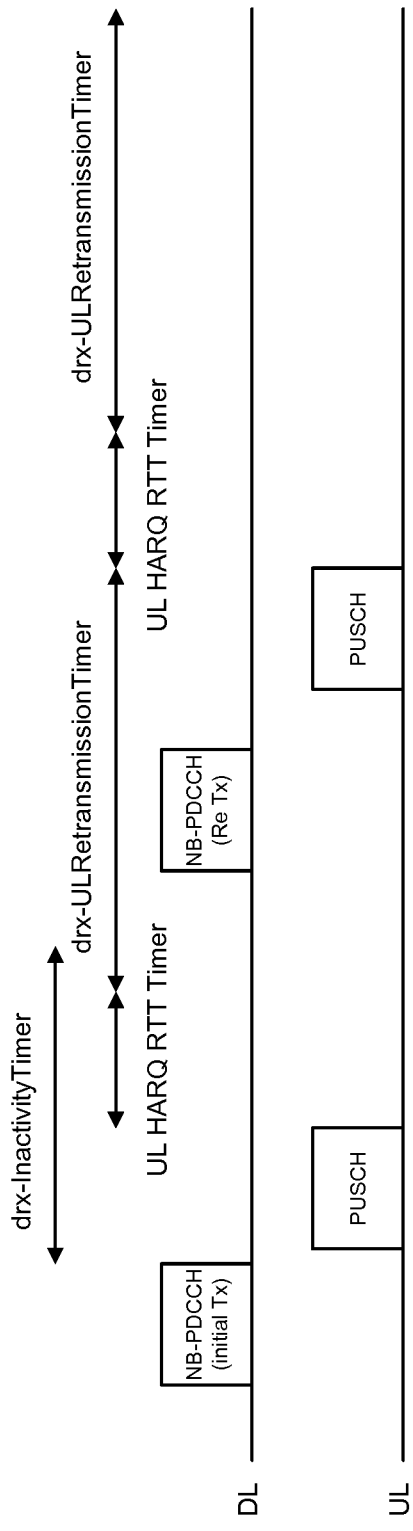
FIG. 9 is a schematic drawing illustrating timers of the DRX and HARQ modes for NB IoT.

The currently agreed (re)transmission operation according to TS 36.321, v13.1.0 (which might be still subject to changes at least for NB IoT) is illustrated in FIG. 9.

FIG. 9 illustrates the transmission and reception operations from the point of view of a UE. In particular, in the downlink (DL), the UE receives scheduling message for an uplink transmission. This message is received on NB-PDCCH which is a physical downlink control channel for the NB IoT. The scheduling message provides the UE with the uplink grant for a first transmission (initial Tx), i.e., transmission of new data (as opposed to retransmission). According to the current standard, upon reception of the NB-PDCCH directed to the UE, the UE starts drx-Inactivity Timer and monitors for the PDCCH. As described above with reference to DRX operation, during the drx-Inactivity Timer, the DRX is inactive, meaning that the PDCCH is monitored.

In accordance with the NB-PDCCH received, the UE then transmits data in the scheduled resources of the PUSCH, physical uplink shared channel. The uplink transmission is performed in the subframe following the subframe in which the grant (NB-PDCCH) was received or in the subframe following the last subframe in which the grant (NB-PD-CCH) is transmitted. In general, the subframe following the subframe with grant may be the immediately following subframe, However, in practice, some predefined or signaled offset may be employed.

The latter is particularly applicable for cases where the NB-PDCCH is repeated over various subframe, when the UE is able to successfully detect the NB-PDCCH before the last repetition has been received. In such a case, it is beneficial for the UE to wait until the end of the NB-PDCCH repetitions so that for the eNB the timing of the corresponding PUSCH is unaffected by a potential early successful decoding of NB-PDCCH.

With the HARQ for NB IoT, two additional timers have been introduced. The RTT timer (UL HARQ RTT Timer) is started upon transmission of scheduled uplink data on PUSCH. The RTT timer corresponds to a minimum amount of subframe(s) (or in general to a minimum time period) before an UL HARQ retransmission grant is expected. During the time period defined by the RTT timer, the UE does not have to decode PDCCH since the eNB is still processing the PUSCH transmission. After expiry of the RTT timer, the retransmission timer (drx-ULRetransmissionTimer) starts, which specifies the maximum number of consecutive PDCCH-subframe(s) (or, in general time period) until an UL retransmission grant is expected to be received. During the running of the retransmission timer, the PDCCH is monitored. In case no PDCCH with scheduling concerning the retransmission is received, it may be assumed that the uplink data (PUSCH transmission) has been received and decoded successfully. In case the eNB did not decode the PUSCH transmission successfully, it schedules a retransmission using the second NB-PDCCH indicating that the grant is for the purpose of data retransmission (ReTx). Since there is only a single HARQ process, no ambiguity is present. Accordingly, the UE transmits in the uplink the retransmission of the PUSCH. As mentioned above this is not necessarily a repeated transmission of the same content but may also be another redundancy version. After the retransmission of the PUSCH, the RTT timer (UL HARQ RTT Timer) is started again in which the PDCCH does not have to be monitored and after its expiry, the retransmission timer (drx-ULRetransmissionTimer) starts, in which the PDCCH is to be monitored for possible retransmission allocation. Even if the data has been decoded correctly after the retransmission, the UE still monitors PDCCH during the entire duration of the retransmission timer and is thus unable to enter the DRX.

As can be seen in FIG. 9, for the last packet, or transport block or MAC PDU (of the data burst to be transmitted in the uplink, e.g., the counter status of a smart meter) which is transmitted on PUSCH, the UE has to unnecessarily wake up for the time where drx-ULRetransmissionTimer running, even though the packet could be correctly decoded by eNB and no further retransmission is being scheduled. There is no possibility to explicitly acknowledge the successful transmission of a MAC PDU. More in particular the eNB can only schedule an initial or retransmission by means of the PDCCH. There is no possibility to signal to the UE that the transmission was successfully decoded without further scheduling a retransmission/new transmission. Since for the case of the last packet neither a further initial transmission nor retransmission is required, the eNB will not send a PDCCH with the consequence that UE will unnecessarily stay awake and monitor for a DCI. This will unnecessarily drain UE's battery. Given that this case will happen for every uplink data transmission, i.e., with every counter status reporting, the additional respectively unnecessary power consumption is not negligible.

The indicated problem is specific to an asynchronous HARQ protocol for the uplink. Therefore it is particularly relevant for Rel-13 eMTC and also NB-IoT, but also for any other systems which may use such asynchronous approach.

Moreover, as can be seen from FIG. 9, the DRX-InactivityTimer specifies the number of consecutive PDCCH-subframe(s) after the subframe in which a PDCCH indicates an initial UL/DL data transmission. The time when Drx-InactivityTimer is running is part of the Active Time, where UE needs to monitor for new DCIs. As shown in FIG. 9 above the Drx-Inactivity Timer is immediately started after the last subframe where NB-PDCCH (DCI format N0) is being transmitted. However, since there is only one HARQ process for NB-IoT, eNB cannot transmit several TBs in parallel. Hence MAC PDUs/TBs needs to be transmitted one after each other. Therefore it is not necessary that UE monitors for a DCI immediately after having received a PDCCH. This behavior will unnecessary drain UE's battery. It is basically sufficient when UE monitors for a DCI (scheduling either a new TB or a retransmission of the same TB) upon having transmitted the PUSCH.

In order to avoid inefficiencies and to enable effective DRX operation, an apparatus is provided for transmitting data over a physical uplink shared channel in a wireless communication system by using a hybrid automatic repeat request, HARQ. The apparatus comprises a first timer (corresponding to the RTT timer described above), which is configured to start upon uplink data transmission and stop (i.e., expire) after expiry a first predetermined time, as well as a second timer (corresponding to the retransmission timer described above) configured to start upon expiry of the first timer and to stop (expire) after expiry of a second predetermined time. Moreover, the apparatus comprises a receiver for receiving downlink control information including a positive acknowledgement for uplink new data transmission or retransmission, the receiver being configured to perform the receiving only when the first timer is stopped (expired) and the second timer is running, wherein the second timer is further configured to stop upon receiving the positive acknowledgement.

Figure 10A:
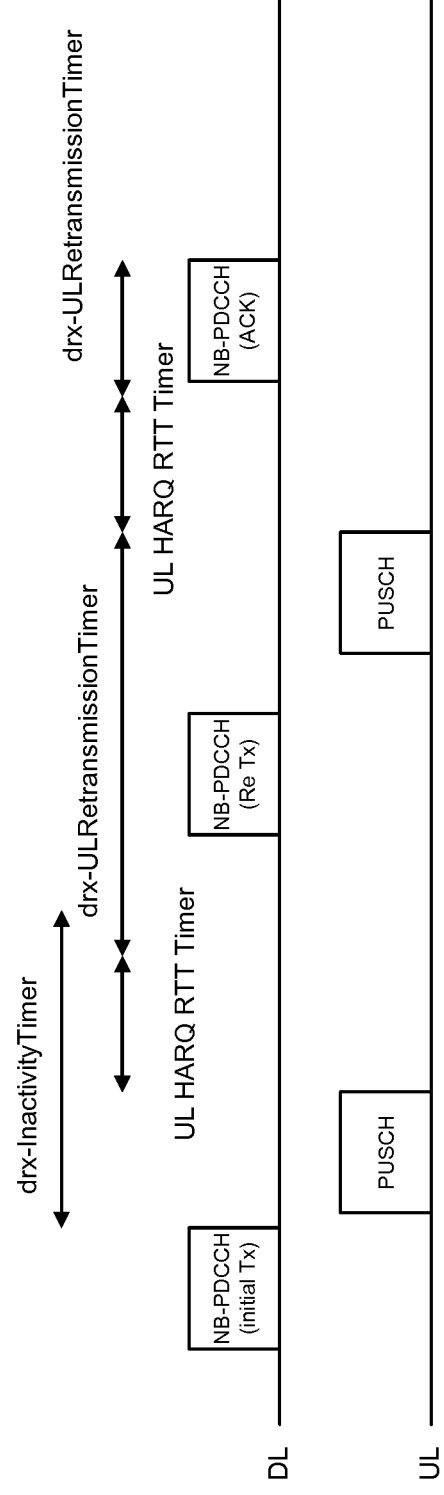
FIG. 10A is a schematic drawing illustrating timers of the DRX and HARQ modes for NB IoT with acknowledgement for uplink.

This apparatus can be a UE as described above, implemented in any form, for instance an NB IoT device installed at a target position in which it performs measurements, of a smartphone, or a module which can be connected to other devices, or the like. The corresponding operation is illustrated in FIG. 10A.

In order to optimize the power consumption of an NB IoT UE which is a vital requirement, eNB should have the possibility to explicitly indicate to the UE that a PUSCH transmission has been successful decoded but without scheduling a further PUSCH transmission (either a new or retransmission). As outlined above the problem arises at every "last MAC PDU transmission" of an UL data burst. Since NB IoT is a UL driven feature, the DRX operation respectively power consumption with respect to uplink data transmission should be optimized.

According to an embodiment, the downlink control channel, i.e., for NB-IoT, the DCI format N0 (NB-PDCCH), is used to indicate the explicit acknowledgement. Correspondingly for eMTC, the M-PDCCH (DCI format 6-0A/6-0B)

would signal the new command. There are several alternatives how the signaling can be implemented.

For instance, a new field in the DCI may be introduced, which signals the explicit acknowledgment. For example, the field could be referred to as "ACK/flush" field. One bit would be sufficient for the field size particularly if there is only one HARQ process. In other words, according to an example, the downlink control information indicates the positive acknowledgement and/or buffer flushing command in a separate one-bit field.

Since the field merely indicates the successful decoding of the preceding PUSCH transmission, the other fields in the DCI are more or less useless (since no new PUSCH transmission is going to be scheduled). Hence, the remaining fields in the DCI may be set to a predefined value, e.g., all set to zero. This provides the additional advantage of increasing the CRC size virtually, i.e., they are set to a predefined value. Then in case that the "ACK/flush" field indicates the explicit acknowledgement, the other fields could be checked if they match the predefined value. Therefore, by setting the remaining fields to a predefined value, the false alarm rate of erroneously detecting an explicit acknowledgement can be greatly reduced.

One exemplary implementation of such DCI is provided below:
Flag for format N0/format N1 differentiation—1 bit, where value 0 indicates format N0 and value 1 indicates format N1
Subcarrier indication—x bits
Resource assignment—x bits
Scheduling delay—x bits
Modulation and coding scheme and redundancy version—x bits
Repetition number—x bits
New data indicator—1 bit
DCI subframe repetition number—x bits
HARQ acknowledgement/flush 1 bit
If the number of information bits in format N0 is less than that of format N1, zeros shall be appended to format N0 until the payload size equals that of format N1.

Similarly a new field could be introduced for the DCI format 6-0A/DCI format 6-0B.

For eMTC, new DCI formats for scheduling a PUSCH transmission have been introduced in TS 36.212 (version 13.0.0 or 13.1.0 which shows formats 6-0A, 6-0B, 6-1A, 6-1B, 6-2.), which are shown below. A new field may be introduced to those formats. In the following, "[2]" refers to 3GPP TS 36.211, version 13.1.0, whereas "[3]" refers to 3GPP TS 36.213, version 13.1.0.

Format 6-0A

DCI format 6-0A is used for the scheduling of PUSCH in one UL cell. The following information is transmitted by means of the DCI format 6-0A:
Flag format 6-0A/format 6-1A differentiation—1 bit, where value 0 indicates format 6-0A and value 1 indicates format 6-1A
Frequency hopping flag—1 bit as defined in section 5.3.4 of [2]
Resource block assignment—+5 bits for PUSCH as defined in [3]:
MSB bits provide the narrowband index as defined in section 5.2.4 of [2]
5 bits provide the resource allocation using UL resource allocation type 0 within the indicated narrowband
Modulation and coding scheme—4 bits as defined in section 8.6 of [3]
Repetition number—2 bits as defined in section 8.0 of [3]
HARQ process number—3 bits
New data indicator—1 bit
Redundancy version—2 bits
TPC command for scheduled PUSCH—2 bits as defined in section 5.1.1.1 of [3]
UL index—2 bits as defined in sections 5.1.1.1, 7.2.1, 8 and 8.4 of [3] (this field is present only for TDD operation with uplink-downlink configuration 0)
Downlink Assignment Index (DAI)—2 bits as defined in section 7.3 of [3] (This field is present only for cases with TDD primary cell and either TDD operation with uplink-downlink configurations 1-6 or FDD operation. This field is reserved when the configured maximum repetition number is larger than 1 for either PDSCH or MPDCCH.)
CSI request—1 bit as defined in section 7.2.1 of [3]
SRS request—1 bit. The interpretation of this field is provided in section 8.2 of [3]
DCI subframe repetition number—2 bits as defined in section 9.1.5 of [3]
If the number of information bits in format 6-0A mapped onto a given search space is less than the payload size of format 6-1A for scheduling the same serving cell and mapped onto the same search space (including any padding bits appended to format 6-1A), zeros shall be appended to format 6-0A until the payload size equals that of format 6-1A.

Format 6-0B

DCI format 6-0B is used for the scheduling of PUSCH in one UL cell. The following information is transmitted by means of the DCI format 6-0B:
Flag for format 6-0B/format 6-1B differentiation—1 bit, where value 0 indicates format 6-0B and value 1 indicates format 6-1B
Resource block assignment—+3 bits for PUSCH as defined in [3]:
MSB bits provide the narrowband index as defined in section 5.2.4 of [2]
3 bits provide the resource allocation within the indicated narrowband as specified in section 8.1.3 of [3]
Modulation and coding scheme—4 bits as defined in section 8.6 of [3]
Repetition number—3 bits as defined in section 8.0 of [3]
HARQ process number—1 bit
New data indicator—1 bit
DCI subframe repetition number—2 bits as defined in section 9.1.5 of [3]
If the number of information bits in format 6-0B mapped onto a given search space is less than the payload size of format 6-1B for scheduling the same serving cell and mapped onto the same search space (including any padding bits appended to format 6-1B), zeros shall be appended to format 6-0B until the payload size equals that of format 6-1B.

Similarly a new field could be introduced for DCI formats 0 or 4, or other DCI formats that grant asynchronous HARQ transmissions with more than one HARQ process, as for example envisioned for the transmission of PUSCH on an unlicensed carrier. In such a case, the DCI format would include a field to determine the applicable HARQ process. As a consequence, also the new field (e.g., "ACK/flush") would be treated as specific to the HARQ process indicated in the corresponding DCI, so that the UE would interpret the field accordingly to apply to the (re)transmission buffer and transmission status for that particular HARQ process only. In an alternative design the new field ("ACK/flush") carries the HARQ process for the explicit acknowledgement, i.e., it indicates a HARQ process ID for which the positive acknowledgement is intended, or it carries a value that indicates no positive acknowledgement. For example, in a case where 10 HARQ processes are supported, values 1-10 in the new field would indicate a positive acknowledgement for the corresponding process, while at least one of the values 11-16 would indicate no positive acknowledgement. In this example, a new field size of 4 bits would be sufficient. Since no positive acknowledgement just implies that no buffer flushing or DRX is intended, it does not need to indicate a specific HARQ process. Retransmissions for the desired process may then be indicated by the same DCI or another DCI at some later time.

As an alternative to the introduction of a new field in the DCI, the downlink control information indicates the positive acknowledgement and/or buffer flushing command in a combination of values in fields that would be interpreted as an invalid or inconsistent assignment of an uplink transmission. In other words, the combination is used of values of fields which have particular meaning independent of positive/negative acknowledgement, while the combined values are selected in a way which is invalid or inconsistent when the meaning of the fields is considered. Accordingly, a UE of earlier releases receive the values and ignore/discard it since it is invalid. However, a UE which supports the above described operation of additional acknowledgement may recognize (interpret) this invalid combination as the positive acknowledgement.

In particular, some of the existing fields or combinations thereof could be se to a predefined value in order to indicate the explicit acknowledgement. For example a combination of field values in the DCI which indicates an incorrect command could be used to signal the new information (explicit acknowledgment). As an example the DCI could indicate a retransmission (same NDI value) of the MAC PDU, but at the same time a different TB size, which is not a correct DCI content. Another example could be to indicate a new transmission (NDI toggled), but at the same time indicating no TB size (e.g., for the PUSCH the MCS index IMCS is set to a value like 29, 30 or 31 for an initial transmission).

In general, there could be several combinations of DCI field values which are not allowed.

When the UE receives the new signal "HARQ acknowledgement/flush," the UE will stop the drx-ULRetransmissionTimer and go to sleep (DRX). Furthermore the UE can also flush the HARQ transmission buffer which is also beneficial in terms of power consumption.

Thus, the power saving gain is caused in that the UE can stop (let expire) the drx-ULRetransmissionTimer earlier and does not need to wait until it would expire in accordance with the timer's predefined/predetermined time interval. Furthermore the UE can flush the HARQ Tx buffer earlier. The corresponding UE behavior is illustrated in FIG. 10A.

FIG. 10A shows a similar scenario as FIG. 9. However, after the retransmission of the PUSCH, when the eNB decodes the PUSCH successfully, the eNB transmits the positive acknowledgement on the NB-PDCCH. The UE stops the retransmission timer upon reception of the positive acknowledgement. According to an advantageous embodiment, the UE also enters the DRX mode upon reception of the positive acknowledgement and thus, starts a DRX timer, i.e., a third timer, during which the PDCCH is not monitored.

As also described with reference to FIGS. 9 and 10, the receiver is advantageously further configured for receiving downlink control information including a resource assignment for retransmission of the uplink data, to indicate that the uplink data has not been successfully decoded. This is illustrated in the figures as NB-PDCCH (ReTx).

Moreover, the apparatus further beneficially comprises a transmitter for performing HARQ retransmission of the uplink data according to the received resource assignment in a physical uplink shared channel upon receiving the uplink resource assignment. This is illustrated in the figures by the second PUSCH in response to the scheduling grant ReTx on the NB-PDCCH.

The positive acknowledgement may also have the effect of (re)transmission buffer flushing. Accordingly, the apparatus further comprises an HARQ controller for flushing the HARQ transmission buffer upon receiving the positive acknowledgement and for entering discontinuous reception mode in which the receiver is configured not to receive the physical downlink control channel.

As can be seen from the figures the NB-PDCCH may be used for different purposes: to schedule a new data transmission, to schedule a retransmission or to provide the positive acknowledgement. Advantageously, the downlink control information indicates either the positive acknowledgement or the resource assignment accompanied by a field for distinguishing between a new transmission and retransmission. Accordingly, positive acknowledgement is only transmitted if no further transmission is to be scheduled.

It is also noted that the present invention is not limited to entering the DRX mode. Alternatively, the new command (positive acknowledgement) signaled on the DCI could also indicate that UE after receiving the command releases the RRC connection and goes to RRC IDLE mode instead of going to DRX. In the RRC IDLE mode, the DRX mechanism is not necessary since the PDCCH monitoring is already performed only with very limited effort, so that a DRX would have no or negligible extra gains as far as buffer management and PDCCH monitoring are affected. This would be also beneficial in terms of power consumptions since eNB would not need to use the RRC procedure for releasing the RRC connection, which takes considerably longer compared to using the a DCI.

For the applicability of the embodiment(s) to features that support more than one HARQ process, there is one drx-ULRetransmissionTimer per HARQ process defined. Consequently, when the UE receives the new signal "HARQ acknowledgement/flush" for a HARQ process, the UE will stop the drx-ULRetransmissionTimer for the corresponding HARQ process. Furthermore the UE can also flush the HARQ transmission buffer for the corresponding HARQ process, which is also beneficial in terms of power consumption. If the drx-ULRetransmissionTimer for all HARQ processes are stopped, then the UE goes to sleep (DRX).

As mentioned in the problem section, the drx-InactivityTimer definition/handling is not optimal from power consumption point of view in particular for the NB-IoT feature, where only one HARQ process is used.

As can be seen from FIG. 9 and as put forward above, currently, the DRX operation is independent of the newly introduced timers (RTT, retransmission timer). Accordingly, the drx-InactivityTimer is started upon reception of NB-PDCCH and runs parallel with the RTT timer.

Starting the drx-Inactivity Timer immediately after the NB-PDCCH (DCI format N0/N1) is not necessary since the eNB can anyway only schedule a further transmission (retransmission or new MAC PDU) upon the corresponding PUSCH/PDSCH transmission. Therefore according to one embodiment, the starting condition of the drx-InactivityTimer is changed such, that the timer should be started after the transmission of the corresponding PDSCH/PUSCH transmission. Since in case of Uplink the eNB needs to first process/decode the received PUSCH transmission before deciding whether to schedule a further retransmission or a new transmission, the drx-Inactivity Timer could be even started only after some fixed time upon the transmission of the PUSCH. For downlink the UE would first need to decode the PDSCH transmission and send the HARQ feedback (ACK/NACK) before eNB could determine whether to schedule a further retransmission or a new transmission. Hence similar to the uplink the drx-Inactivity Timer could be only started upon some fixed time (processing time) after the transmission of the PDSCH.

According to another embodiment the DRX procedure for NB-IoT is even further optimized/simplified.

In this embodiment the DRX operation is performed without a drx-InactivityTimer. More in particular as already described above when drx-InacitvityTimer is started some predefined time after the transmission of the PUSCH (for the uplink case), then the functionality of the drx-InactvityTimer is similar to the drx-ULRetransmissionTimer and the UL HARQ RTT Timer. Essentially for the uplink the DRX operation according to this embodiment would be like the following: after having transmitted the last subframe of the PUSCH transmission (which was, e.g., scheduled by NB-PDCCH), the UE starts the UL HARQ RTT timer. Upon expiry of the UL HARQ RTT timer the UE starts the ULRetransmissionTimer and monitors for PDCCH/NB-PD-CCH (scheduling a retransmission or a new transmission). By this the Active Time is reduced and also by removing the drx-InactivityTimer also further testing complexity is removed.

Figure 11:
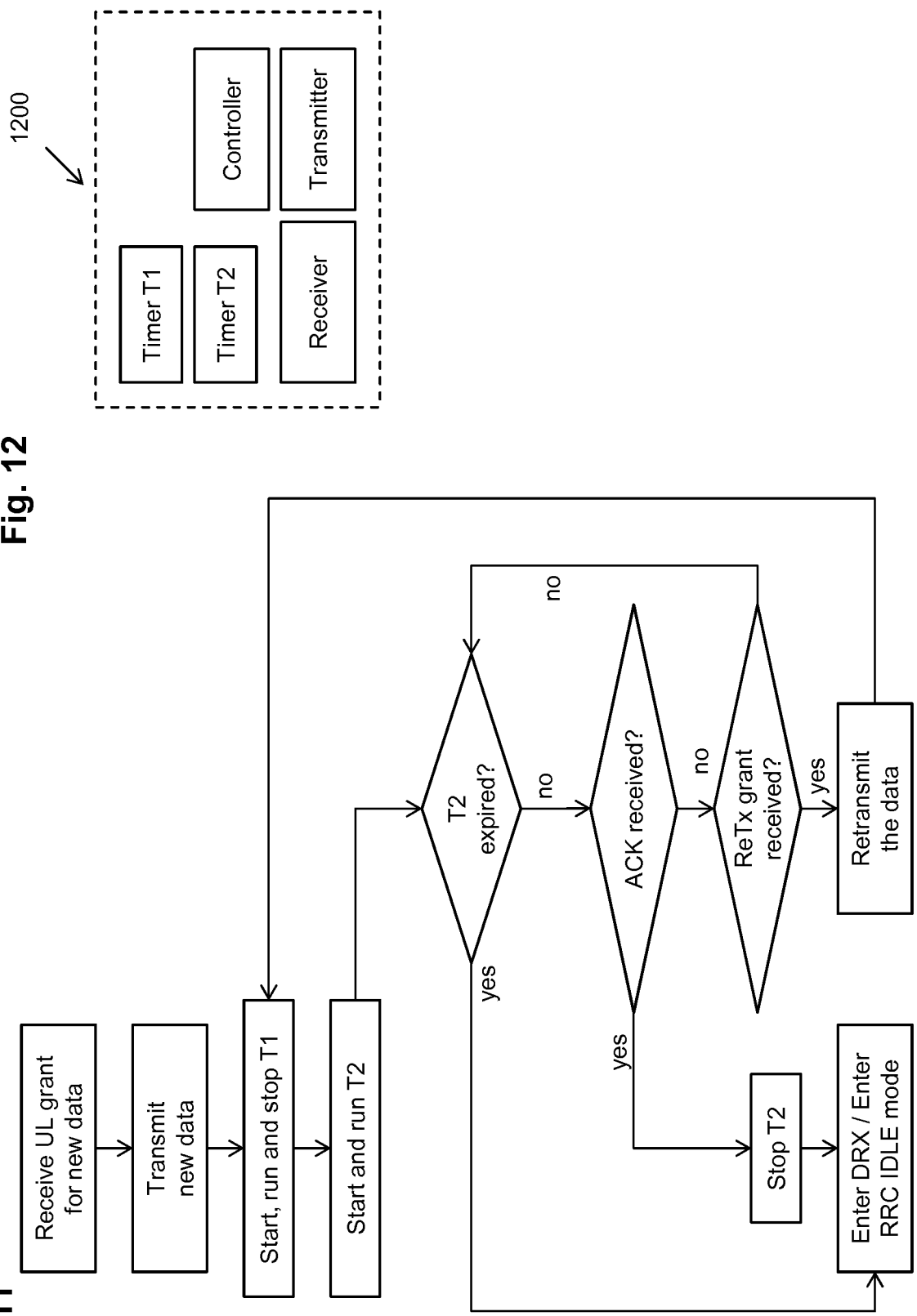
FIG. 11 is a flow diagram illustrating a method for transmitting uplink data.

FIG. 11 shows a flow diagram illustrating an embodiment of the invention as a method which may be performed at the UE.

Figure 12:
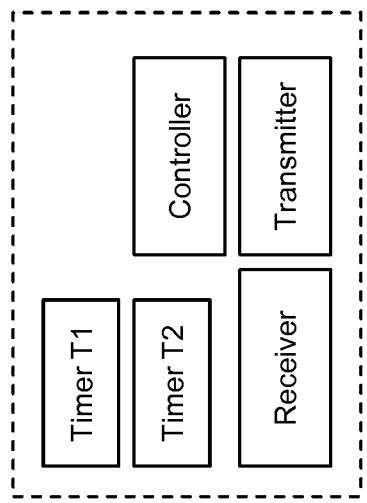
FIG. 12 is block diagram illustrating apparatuses for transmitting and receiving data.

FIG. 12 shows a block diagram of an apparatus 1200 according to the present disclosure, as described above.

For the downlink the behavior according to this embodiment would be similar.

An example of downlink data transmission is illustrated in FIG. 10B. In particular, in FIG. 10B, the UE receives an NB-PDCCH with a grant for an initial (new data) transmission of a PDSCH and receives the scheduled (granted) PDSCH then (between the reception of the NB-PDCCH and the PDSCH there may be a predefined or a signaled offset, in some systems it may be possible to receive the PDSCH in the same or immediately following subframe).

Upon receiving the PDSCH (being scheduled by the DCI in the NB-PDCCH) the UE will try to decode the PDSCH and transmit in return some HARQ feedback (ACK/NACK). The UE will start the (DL) HARQ RTT timer in the subframe containing the last repetition of the corresponding PDSCH reception. The repetitions are described in the above background section with reference to NB-IoT/eMTC. In order to increase coverage, the data are sent repeated several times in the time domain. However, it is noted that the present invention is not limited to performing the retransmissions and in general, a single transmission may also be performed in which case the DL HARQ RTT timer starts upon the reception of the PDSCH.

Upon expiry of the (DL) HARQ RTT timer, UE will start the drx-RetransmissionTimer and monitor for further DCI(s) scheduling a retransmission or a new transmission. In other words, if the DL HARQ RTT Timer expires in this subframe, the drx-RetransmissionTimer is started.

In the example of FIG. 10B, during the drx-RetransmissionTimer running, the UE receives scheduling DCI (NB-PDCCH) for the retransmission (Re Tx) and then, in accordance with the scheduling DCI—on the scheduled resources the PDSCH with the retransmitted data. This data is decoded successfully by the UE and thus, an ACK is transmitted in the uplink.

Essentially different to the current definition of the drx-RetransmissionTimer, the drx-RetransmissionTimer according to this embodiment will be also started in case the packet (PDSCH) could be decoded correctly by the UE (i.e., after the transmission of the ACK). This allows the network to schedule a new transmission after the retransmissions have finished. Currently the drx-RetransmissionTimer is only started in case the UE could not decode the packet correctly (NACK).

This can be seen in FIG. 10B, in which after ACK reception, the drx-RetransmissionTimer still starts after the DL HARQ RTT timer expires. Within the drx-RetransmissionTimer running, the NB-PDCCH for another initial (new data) transmission is received and the correspondingly scheduled data in PDSCH is received.

It is noted that the above description has been focused on one HARQ process. In LTE, currently, for NB-IoT there also in downlink there is only one HARQ process. However, for eMTC or LAA there could be more HARQ processes. In general, the present disclosure is not limited to one process only. In the above described way, a plurality of processes may be handled.

Alternatively and according to a further embodiment, the drx-InactivityTimer is indeed started, but only for the case when UE could decode a packet correctly, i.e., after the last HARQ transmission of a TB. The definition of the drx-RetransmissionTimer is not changed according to this embodiment. Essentially the drx-RetransmissionTimer takes care about further retransmissions being scheduled for a TB, i.e., is only started upon expiry of the HARQ RTT Timer when the TB could not be decoded correctly, whereas the drx-InactivityTimer controls the PDCCH monitoring for new initial transmissions, i.e., drx-InactivityTimer is started upon expiry of HARQ RTT timer when TB could be decoded correctly.

This embodiment is exemplified in FIG. 10C. The difference to FIG. 10B is in that after the transmission of the positive acknowledgement (ACK), the drx-RetransmissionTimer is not started. Rather, the drx-InactivityTimer is started. However, in both cases, i.e., during the running drx-RetransmissionTimer as well as during the running drx-InactivityTimer, the NB-PDCCH is monitored. It is noted that these two timers drx-RetransmissionTimer and the drx-InactivityTimer may also have different time durations.

According to an embodiment, an apparatus is provided for receiving data over a physical downlink shared channel in a wireless communication system by using an asynchronous hybrid automatic repeat request, HARQ. The apparatus comprises: a receiver configured to receive downlink control information including resource assignment for downlink transmission; and to perform reception of data in the assigned resources accordingly, and to perform transmissions of acknowledgement related to said downlink transmission, the apparatus further comprises a fourth timer which is configured to start upon the downlink data transmission and stop (expire) after expiry a fourth predetermined time and a fifth timer configured to start upon expiry of the fourth timer and to stop (expire) after expiry of a fifth predetermined time, the receiver being configured to perform receiving of downlink control information only when the fourth timer is stopped (expired) and the fifth timer is still running, wherein the fifth timer is further configured not to start upon transmitting a positive acknowledgement.

This apparatus may be a UE receiving downlink data. It is noted that the UE may be capable of operating in both uplink and downlink as described above. One of the advantages in both directions is that with the reception or transmission of the positive acknowledgement, the DRX may be entered earlier thus saving battery.

Advantageously, the fifth timer is further configured to start irrespectively of whether or not the receiver transmits a positive acknowledgement for the downlink data transmission.

According to an embodiment, an apparatus is provided for transmitting data over a physical downlink shared channel in a wireless communication system by using an asynchronous hybrid automatic repeat request, HARQ. The apparatus comprises: a transmitter configured to transmit downlink control information including resource assignment for downlink transmission; and to perform transmission of data in the assigned resources accordingly, and to perform receptions of acknowledgement related to said downlink transmission, the apparatus further comprises a fourth timer which is configured to start upon the downlink data transmission and stop after a fourth predetermined time and a fifth timer configured to start upon expiry of the fourth timer and to expire after a fifth predetermined time, the transmitter being configured to perform transmission of downlink control information only when the fourth timer is expired and the fifth timer is running, wherein the fifth timer is further configured not to start upon receiving a positive acknowledgement.

This apparatus may be implemented in an eNB, i.e., at a base station.

In accordance with another embodiment, a computer program product comprising a computer-readable medium having a computer-readable program code embodied thereon is provided, the program code being adapted to carry out the present invention.

Other exemplary embodiments relate to the implementation of the above described various embodiments using hardware and software. In this connection a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present disclosure relates to transmitting data over a physical uplink shared channel in a wireless communication system by using an asynchronous hybrid automatic repeat request, HARQ. An exemplary apparatus comprises a first timer configured to start upon uplink data transmission and stop after a first predetermined time; a second timer configured to start upon stop of the first timer and to stop after a second predetermined time; a receiver for receiving downlink control information including a positive acknowledgement for uplink new data transmission or retransmission, the receiver being configured to perform the receiving only when the first timer is stopped and the second timer is running, wherein the second timer is further configured to stop upon receiving the positive acknowledgement. Moreover, an apparatus for receiving the data and transmitting the control channel is provided as well as the corresponding transmitting and receiving method.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for transmitting data over a physical uplink shared channel in a wireless communication system using an asynchronous hybrid automatic repeat request, HARQ, the apparatus comprising:
   a first timer configured to start upon uplink data transmission and expire after a first predetermined time;
   a second timer configured to start upon expiry of the first timer and to expire after a second predetermined time;
   a receiver for receiving downlink control information including a positive acknowledgement for the uplink data transmission or retransmission, or a resource assignment accompanied by a field for distinguishing between a new transmission and a retransmission, wherein the resource assignment accompanied by the field indicating the retransmission indicates that uplink data of the uplink data transmission has not been successfully decoded, and wherein the receiver is configured to perform the receiving only when the first timer is expired and the second timer is running; and
   a transmitter for performing HARQ retransmission of the uplink data according to the received resource assignment in the physical uplink shared channel upon receiving the resource assignment,
   wherein the second timer is further configured to stop upon receiving the positive acknowledgement.

2. The apparatus according to claim 1, further comprising:
a HARQ controller for flushing a HARQ transmission buffer of the apparatus upon receiving the positive acknowledgement and for entering a discontinuous reception mode in which the receiver is configured not to receive a physical downlink control channel.

3. The apparatus according to claim 1, wherein the downlink control information indicates the positive acknowledgement and/or a buffer flushing command for flushing a buffer of the apparatus in at least one of:
a separate one-bit field; and
a combination of values in fields that is otherwise interpreted as an invalid or inconsistent assignment of an uplink transmission.

4. The apparatus according to claim 1,
including a controller for controlling the apparatus to release an Radio Resource Control (RRC) connection to the wireless communication system and to enter an IDLE mode in which the receiver is configured to receive only a broadcast channel.

5. Apparatus for receiving data over a physical downlink shared channel in a wireless communication system by using an asynchronous hybrid automatic repeat request, HARQ, the apparatus comprising:
a receiver configured to receive downlink control information including resource assignment for downlink transmission and to perform reception of data in the assigned resources accordingly, and to perform transmissions of acknowledgement related to said downlink transmission,
the apparatus further comprises a first timer which is configured to start upon the downlink transmission and expire after a predetermined time; and
a second timer configured to start upon expiry of the first timer and to expire after a second predetermined time,
the receiver being configured to receive the downlink control information only when the first timer is expired and the second timer is running, wherein the second timer is further configured not to start upon transmitting a positive acknowledgement.

6. An apparatus for receiving data over a physical uplink shared channel in a wireless communication system by using an asynchronous hybrid automatic repeat request, HARQ, the apparatus comprising:
a first timer configured to start upon uplink data reception and expire after a first predetermined time;
a second timer configured to start upon expiry of the first timer and to expire after a second predetermined time; and
a transmitter for transmitting downlink control information including a positive acknowledgement for uplink new data transmission or retransmission, the transmitter being configured to perform the transmitting only when the first timer is expired and the second timer is running,
wherein the second timer is further configured to stop upon transmitting the positive acknowledgement.

7. A method for transmitting data over a physical uplink shared channel in a wireless communication system using an asynchronous hybrid automatic repeat request, HARQ, comprising:
starting a first timer upon uplink data transmission and expiring the first timer after a first predetermined time;
starting a second timer upon expiry of the first timer and expiring the second timer after a second predetermined time;
receiving downlink control information including a positive acknowledgement for the uplink data transmission or retransmission, or a resource assignment accompanied by a field for distinguishing between a new transmission and retransmission, wherein the resource assignment accompanied by the field indicating retransmission indicates that uplink data of the uplink data transmission has not been successfully decoded, and wherein the receiving is only performed when the first timer is expired and the second timer is running; and
performing HARQ retransmission of the uplink data according to the received resource assignment in the physical uplink shared channel upon receiving the resource assignment,
wherein the second timer stops upon receiving the positive acknowledgement.

8. The method according to claim 7, further comprising:
an HARQ controller for flushing a HARQ transmission buffer upon receiving the positive acknowledgement and for either entering a discontinuous reception mode in which the receiver is configured not to receive a physical downlink control channel or releasing a Radio Resource Control (RRC) connection to a communication network as well as entering an IDLE mode in which the receiver is configured to receive only a broadcast channel.

9. The method according to claim 7, wherein the downlink control information indicates the positive acknowledgement and/or buffer flushing command for flushing a buffer in at least one of:
a separate one-bit field; and
a combination of values in fields that is otherwise interpreted as an invalid or inconsistent asssignment of an uplink transmission.

10. A method for receiving data over a physical downlink shared channel in a wireless communication system by using an asynchronous hybrid automatic repeat request, HARQ, the method comprising:
receiving downlink control information including resource assignment for downlink transmission; and
performing reception of data in the assigned resources accordingly, and transmitting acknowledgement related to said downlink transmission,
starting a first timer upon the downlink transmission and expiring the first timer after a predetermined time,
starting a second timer upon stopping the first timer and expiring the second timer after a second predetermined time, wherein the second timer starts irrespectively of whether or not a positive acknowledgement for the downlink transmission is transmitted, and
receiving the downlink control information only when the first timer is expired and the second timer is running, wherein the second timer stops upon transmitting the positive acknowledgement.

11. A method for receiving data over a physical uplink shared channel in a wireless communication system by using an asynchronous hybrid automatic repeat request, HARQ, comprising:
starting a first timer upon uplink data reception and expiring the first timer after a first predetermined time;
starting a second timer upon expiring the first timer and expiring the second timer after a second predetermined time; and
transmitting downlink control information including a positive acknowledgement for uplink new data transmission or retransmission, wherein the transmitting is performed only when the first timer is expired and the second timer is running, wherein the second timer stops upon transmitting the positive acknowledgement.

* * * * *